US012542365B2

(12) United States Patent
Burnside et al.

(10) Patent No.: US 12,542,365 B2
(45) Date of Patent: Feb. 3, 2026

(54) RFID FOLDABLE ANTENNA

(71) Applicants: DJB Group LLC, Dublin, OH (US); Wistron NeWeb Corporation, Hsinchu (TW)

(72) Inventors: Walter D. Burnside, Dublin, OH (US); Jeffrey J. Burnside, Galloway, OH (US); Robert J. Burkholder, Lake Charles, LA (US)

(73) Assignees: DJB GROUP LLC, Dublin, OH (US); WNC CORPORATION, Hsinchu (TW)

( * ) Notice: Subject to any disclaimer, the term of this patent is extended or adjusted under 35 U.S.C. 154(b) by 141 days.

(21) Appl. No.: 18/172,537

(22) Filed: Feb. 22, 2023

(65) Prior Publication Data

US 2024/0283159 A1 Aug. 22, 2024

(51) Int. Cl.
*H01Q 9/26* (2006.01)
*H01Q 1/22* (2006.01)

(52) U.S. Cl.
CPC ............. *H01Q 9/26* (2013.01); *H01Q 1/2208* (2013.01)

(58) Field of Classification Search
None
See application file for complete search history.

(56) References Cited

U.S. PATENT DOCUMENTS 6,407,669 B1 * 6/2002 Brown ................. G08B 13/244 340/572.1
7,540,428 B2 * 6/2009 Baba ................ G06K 19/07758 235/492
8,058,998 B2 11/2011 Burnside et al.
9,213,874 B2 12/2015 Burnside
2010/0060457 A1 * 3/2010 Burnside ............. H01Q 21/005 343/810
2014/0009266 A1 * 1/2014 Burnside .................. H01Q 9/28 340/10.1
2016/0049729 A1 * 2/2016 Chan ........................ H01Q 1/40 343/868
2019/0000343 A1 * 1/2019 Freeman ................ A61B 5/257
2022/0102864 A1 * 3/2022 Morimoto ............ H01Q 1/3291
2022/0180081 A1 6/2022 Burnside et al.

FOREIGN PATENT DOCUMENTS

WO WO-2016010025 A1 * 1/2016 ......... H01F 27/2804

OTHER PUBLICATIONS

Mylar, Plastic Sheet—What is Mylar_ Grafix Plastics, captured by Wayback Machine on Apr. 22, 2022 https://www.grafixplastics.com/grafix-plastics/plastic-film-plastic-sheet-faq/mylar_what/ (Year: 2022).*

* cited by examiner

*Primary Examiner* — Dameon E Levi
*Assistant Examiner* — Ahn N Ho
(74) *Attorney, Agent, or Firm* — Wentsler LLC

(57) ABSTRACT

An RFID antenna having two flexible elongated conductive transmission lines with coplanar RFID energy radiation perturbations distributed along the transmission lines, the transmission lines and perturbations being folded between ends of the transmission lines so that the transmission lines of one fold overlie and are adjacent the transmission lines of the other fold and an electrically insulating layer disposed between lengths of the transmission lines on either side of the fold.

11 Claims, 2 Drawing Sheets

RFID FOLDABLE ANTENNA

BACKGROUND OF THE INVENTION

The invention relates to RFID antennas.

PRIOR ART

U.S. Pat. No. 8,058,998 discloses a high performance RFID antenna that has serpentine transmission or feed lines and dipoles or stubs forming perturbations spaced along the length of the transmission lines. The transmission lines and dipoles are encased between two foam boards to produce an assembly that is planar and relatively rigid. The patented antenna has the capability to provide item level service.

There are instances where an RFID antenna may be required, for space, protection and/or aesthetic reasons, to be incorporated into a cabinet, a portal such as a doorway, a wall or other space. In many of these instances a rigid, relatively long antenna cannot be readily accommodated. Thus, there is a need for an effective RFID antenna that can be adapted to the confines imposed by the environment in which the antenna is to be used.

SUMMARY OF THE INVENTION

It has been discovered that an antenna, such as disclosed in the aforementioned patent, which is folded, essentially on itself, or otherwise distorted from a single plane, if properly done, does not suffer a loss of performance and in some cases may obtain improved results. To accomplish this versatility, the antenna transmission lines and dipoles are preferably mounted on a flexible film and free of the confines imposed when attached to a rigid body. For greatest performance, the stubs or radiators of one folded layer should not overlap or cross stubs of another folded layer.

Folding, if done properly, can improve performance and will not degrade performance. For example, the fold is done to best ensure that all tags are read within and constrained to the desired read zone. Also this folding may have the potential to reduce the number of required antennas to read all tags, thus providing a more efficient solution.

DESCRIPTION OF THE PREFERRED EMBODIMENTS

Figure 4:
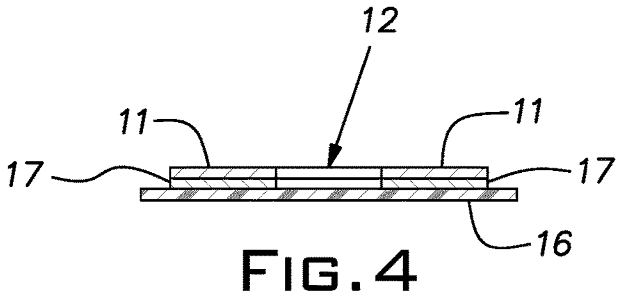
FIG. 4 is a cross-sectional view of the antennas shown in FIGS. 1-3.

An RFID antenna 10 of the invention, has parallel feed lines or transmission lines 11, spaced by a small gap 12, arranged in a serpentine, curvilinear pattern symmetrical with an axis 13. The transmission lines 11 can be a thin foil of aluminum or other conductive metal. Dipoles or stubs 14 located where the transmission lines cross the axis 13 are electrically connected to a respective feed line 11 and can be of the same conductive material as the feed line. Preferably, the feed lines 11 and dipoles or radiators 14 are coplanar. As shown, the dipoles are perpendicular to the local orientation of their respective feed line and are preferably at an angle of +45 degrees or −45 degrees relative to the axis. Each of the feed lines 11 at one end are independently connected to either the inner conductor of a coaxial cable or the outer conductor. The antenna is characterized by diversity of both electric field polarization and beam direction with a relatively uniform signal strength emitted from each dipole radiator 14.

Figure 1:
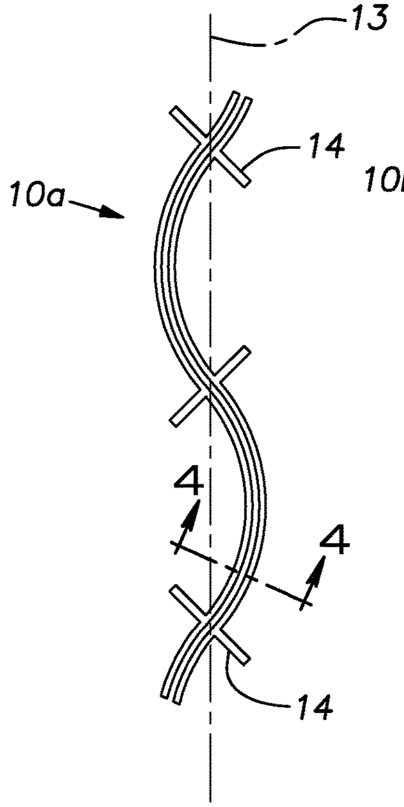
FIG. 1 is a schematic plan view of a nominal three foot antenna constructed in accordance with the invention.
Figure 2:
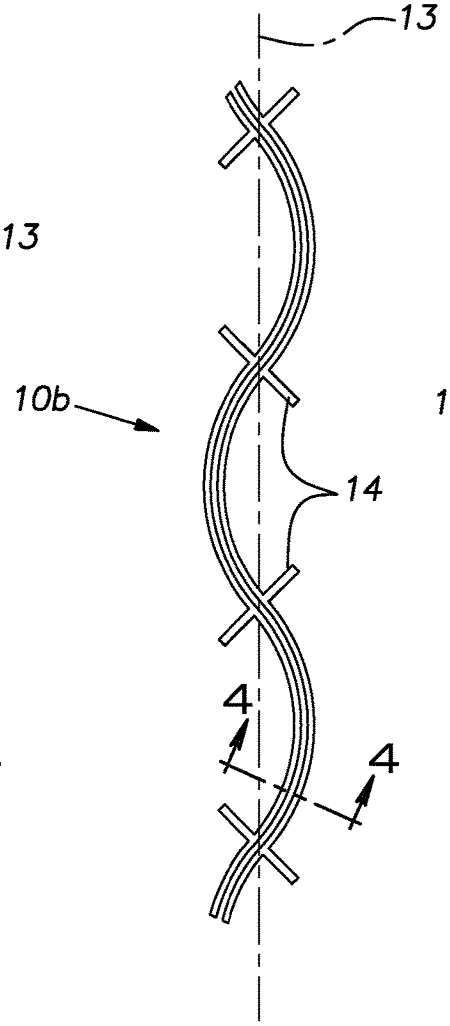
FIG. 2 is a schematic plan view of a nominal five foot antenna constructed in accordance with the invention.
Figure 3:
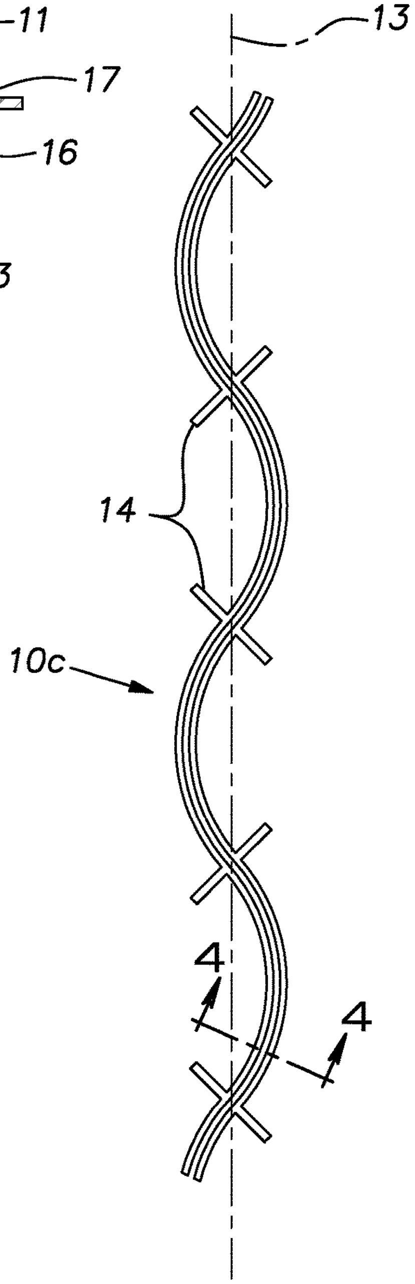
FIG. 3 is a schematic plan view of a nominal seven foot antenna constructed in accordance with the invention.

FIG. 4 illustrates a typical cross-section of the antennas of FIGS. 1-3. A flexible base 16 of, for example, Mylar® in a thickness of 0.1 mm carries a thin foil of 0.1 mm aluminum that forms the feed lines 11 and dipoles 14. The aluminum foil is fixed to the Mylar® base 16 by double-sided tape 17. The Mylar® film or sheet 16 is resiliently flexible in its plane, as is the aluminum foil, forming the co-planar feed lines 11 and stubs 14, as well as the adhesive tape 17.

Figure 6:
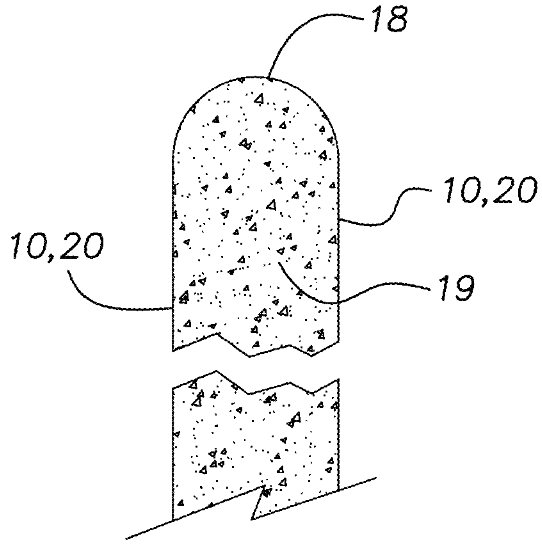
FIG. 6 is a cross-section of a non-conductive plastic foam between lengths of transmission lines on either side of a fold.

The antenna 10, supported on the layer of Mylar® film 16 can be folded on itself, front-to-front or back-to-back to form a sandwich of layers 20 of preferably not less than ½ inch thickness without damage to the Mylar® film, transmission lines, stubs or tape. The radius of the fold 18 should thus not be less than ¼ inch. To prevent coupling between the feed lines 11 of the folded layers 20, a non-conductive plastic foam layer 19 (FIG. 6) of, for example, 0.5 inches thickness can be disposed between the layers.

Figure 5:
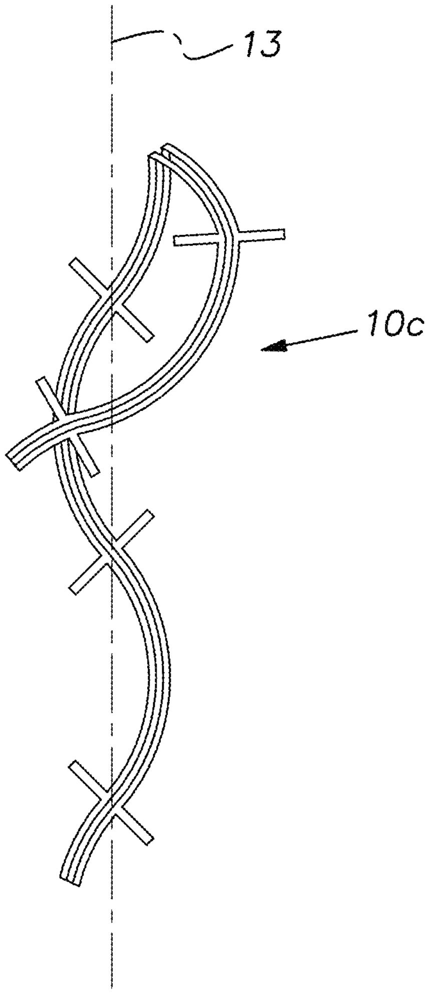
FIG. 5 is an example of a preferred way of folding an antenna such as the 7 foot antenna of FIGS. 3.

For proper antenna operation, the composite of the base Mylar® and transmission lines should be folded in such a way that dipoles 14 or of one layer do not overlap the dipoles or perturbations of another layer. FIG. 5 shows this condition which improves radiation diversity.

The dipoles or stubs 14 as described above are directly connected to the feed lines 11. These stubs 14 represent perturbations to the feed lines 11 and radiate RFID energy. Equivalent perturbations, also co-planar with the feed lines 11, can be in the form of sharp changes in the path or shape of the planar feed lines such as notches cut into the feed lines, abrupt changes in the electrical properties of the feed lines (e.g. width and spacing of the coplanar feed lines). The radiating stubs 14 or their equivalents need not be in electrical contact with the feed line. Slot, loop or patch radiators may be used and they may be capacitively or inductively functionally coupled to each strip of the feed line. The perturbations or stubs 14 can be positioned about (i.e. ±15%) a wavelength apart.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An RFID antenna having:

two flexible elongated conductive transmission lines with coplanar RFID energy radiation perturbations distributed along the transmission lines, the two flexible elongated conductive transmission lines both being folded at a fold around a distal end of a non-conductive plastic foam layer to form two first legs to one side of the fold and two second legs to an opposite side of the fold, wherein the two first legs are positioned adjacent a first surface of the non-conductive plastic foam layer and the two second legs are positioned adjacent an opposite second surface of the non-conductive plastic foam layer and wherein the coplanar RFID energy radiation perturbations of the two first legs do not overlie the coplanar RFID energy radiation perturbation of the two second legs.

2. The antenna as set forth in claim 1, wherein said transmission lines are in a serpentine pattern.

3. The antenna as set forth in claim 1, wherein said perturbations are stubs extending from said transmission lines.

4. An RFID antenna comprising:

a pair of elongated parallel spaced-apart feed lines and radiation producing perturbations spaced-apart along the feed lines, said feed lines and said perturbations lying in a common plane, the feed lines comprising flat metal conductors, the feed lines being flexible and supported on a flexible layer, whereby said feed lines are capable of being bent to define a fold without damage to said flexible layer out of a single plane wherein an inner radius of the fold is not less than ¼ inch and wherein the perturbations on a portion of the feed lines to a first side of the fold do not overlie the perturbations on a portion of the feed lines to a second, opposite side of the fold.

5. The RFID antenna as set forth in claim 4, wherein said feed lines are in a serpentine pattern.

6. The RFID antenna as set forth in claim 4, wherein said perturbations are stubs extending laterally away from the feed lines.

7. The RFID antenna as set forth in claim 6, wherein the stubs are joined to a respective one of said feed lines.

8. The RFID antenna as set forth in claim 4, wherein said flexible layer is a plastic film.

9. The RFID antenna as set forth in claim 4, wherein said metal conductors are aluminum of 0.1 mm thickness.

10. An RFID antenna having: elongated parallel transmission lines and radiation emitting perturbations distributed along the transmission lines, said transmission lines and said radiation emitting perturbations being coplanar and in a resiliently flexible state devoid of rigid support structures enabling the transmission lines to be bent to define a fold with a radius as small as ¼ inch out of a plane without damage to conform to a rigid structure and wherein the radiation emitting perturbations on a portion of the transmission lines to a first side of the fold do not overlie the radiation emitting perturbations on a portion of the transmission lines to a second, opposite side of the fold.

11. The RFID antenna of claim 10 being capable of being folded so that said transmission lines are folded on themselves into a sandwich-like structure having a layer-to-layer dimension between lengths of the transmission line as small as ½ inch without damage.

* * * * *